Figures 1, 2:
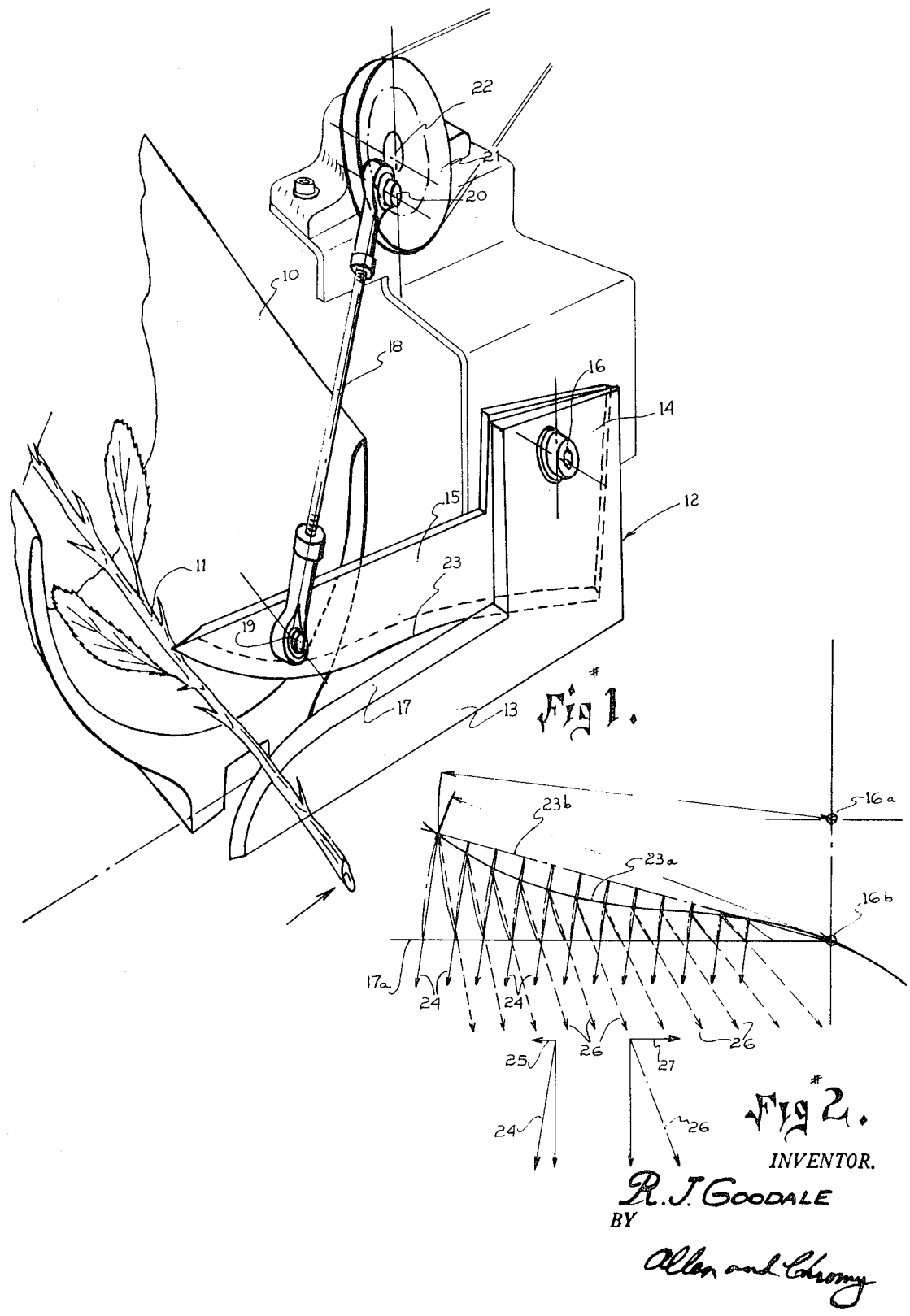

United States Patent [19]
Goodale

[11] 3,738,212
[45] June 12, 1973

[54] APPARATUS FOR TRIMMING THE STEMS OF CUT FLOWERS

[76] Inventor: Richard J. Goodale, P.O. Box 268, Watsonville, Calif. 95076

[22] Filed: May 14, 1971

[21] Appl. No.: 143,495

[52] U.S. Cl. ............... 83/602, 83/607, 30/228, 30/259
[51] Int. Cl. ............................................. B26d 5/14
[58] Field of Search ............... 83/602, 607; 30/131, 30/134, 135, 228, 247, 259, 250, 249, 251, 257

[56] References Cited
UNITED STATES PATENTS

| | | | |
|---|---|---|---|
| 1,755,511 | 4/1930 | Miller | 30/228 |
| 2,557,506 | 6/1951 | Kovacevich | 30/259 |
| 298,768 | 5/1884 | Nagley | 30/259 |
| 761,314 | 9/1903 | Marxmiller | 83/602 |

*Primary Examiner*—Gil Weidenfeld
*Attorney*—Allen & Chromy

[57] ABSTRACT

An apparatus for trimming the stems of cut flowers as the cut flowers are conveyed into and past a cutting device. The cutting device is in the form of a shear employing a pair of sharp blades, one of which is movable and is supported by a pivot. The pivot is located well above the line of travel of the flower stems passing through the cutting device and the sharp edge of the movable blade is shaped so that the flower stem being cut by the cutting device is drawn into the device by the cutting action thereof simultaneously as the flower stem is conveyed through the cutting device.

4 Claims, 2 Drawing Figures

PATENTED JUN 12 1973

3,738,212

INVENTOR.
R. J. GOODALE
BY
Allen and Chromy

APPARATUS FOR TRIMMING THE STEMS OF CUT FLOWERS

DESCRIPTION OF THE INVENTION

This invention relates to a trimming device for trimming the stems of cut flowers.

An object of this invention is to provide an improved apparatus for trimming the stems of cut flowers.

Still another object of this invention is to provide an improved trimming device for cutting the stems of cut flowers as the cut flowers are carried past a cutting device, said cutting device being provided with a shear having a movable blade provided with a sharp edge that is shaped to draw the flower stem into the shearing device as the stem thereof is being cut.

Still another object of this invention is to provide an improved flower stem cutting device attached to the side of a conveyor of a rose or cut flower grading apparatus.

Other and further objects of this invention will be apparent to those skilled in the art to which it relates from the following specification, claims and drawing.

In accordance with this invention there is provided an improved flower stem trimming apparatus that may be used in conjunction with the apparatus for sorting and grading cut flowers disclosed in my Application Ser. No. 73,837, now U.S. Pat. No. 3,645,394 filed Sept. 21, 1970. The stem cutting device which is in the form of a shear is adapted to be attached to the frame of the cut flower grading apparatus so that the pivot of the movable shear blade is located well above the line of travel of the cut flower stems that are carried in the trays of the conveyor. The location of the shear pivot and the curved contour of the pivoted shear blade provide an improved stem cutting action such that the flower stem being cut is actually drawn into the sharp blades thereby resulting in a clean cut.

Further details and features of this invention will be set forth in the following specification, claims and drawing in which briefly:

FIG. 1 is a perspective view of the cutting device of this invention located at one end of a cut flower carrying tray which is shown partially broken away; and FIG. 2 is a diagrammatic view used to illustrate the improved cutting action of this device.

Referring to the drawing in detail reference numeral 10 designates a cut flower carrying tray which is partially broken away and which is of the type disclosed in my Application Ser. No. 73,837, now U.S. Pat. No. 3,645,394. The cut flower having the stem 11 is placed in the tray 10 and the tray is moved by a conveying apparatus such as disclosed in the aforesaid application so that the stem 11 is moved through the cutting device 12 which is also attached to the frame of the cut flower grading apparatus disclosed in the aforesaid application.

The cutting device 12 is provided with a fixed blade 13 which has an upright portion 14 to which the movable blade 15 is attached by the pivoting bolt 16. The fixed blade 13 is provided with a sharp edge 17 that is substantially horizontal and is positioned at the level of the bottom of the tray 10 so that the flower stem 11 is moved upon this horizontal portion 17. One end of the rod 18 is connected to the moveable blade 15 by the pivot pin 19 and the other end of this rod is connected to the pin 20 of the eccentric drive 21 which is supported on the shaft 22. The shaft 22 is driven by a motor (not shown) which is attached to the frame of the cut flower grading apparatus. A suitable speed reduction gearing (not shown) may be provided between the shaft 22 and the drive motor, if desired. This drive mechanism moves the blade 15 up and down with respect to the pivot 16 so that the sharp edge 23 of this blade and the sharp edge 17 of blade 13 provide a shearing action as the stem 11 of the cut flower is moved through the cutting device and the excess length of the stem is sheared off. The blade 15 is moved up and down several times while the cut flower is moved through the cutting device 12.

The location of the pivot 16 which supports the movable blade 15 on the upright 14 is located well above the bottom of the tray 10. The horizontal portion of the sharp edge 17 is located substantially in a line with the bottom of the tray 10 and is designated in FIG. 2 by the line 17a which indicates the locus of movement of flower stem 11. Point 16a corresponds to the pivot 16 and the line 23a designates the curvature of the cutting edge 23 of the movable blade 15. Broken line 23b designates the straight cutting edge of the conventional shear which would be pivotally attached to the other blade of the conventional shear at the pivoting point 16b.

As the blades of a conventional shear are brought together in the shearing process the action on the flower stem being cut is in the direction indicated by the array of parallel lines 24. In the cutting action of a conventional shear there is therefor produced a horizontal force indicated by the member 25 in the force diagram tending to push the flower stem out of the shear. By locating the pivot of the movable blade at the point 16a which is well above the line of travel of the flower stem and also by providing a curved cutting edge 23 to the movable blade 15 as designated by the curved line 23a the cutting force exerted by this edge on the flower stem is in the direction designated by the array of broken lines 26. The directions of these lines are inward with respect to the cutting edges of the device and thus these cutting forces have a horizontal component 27 as shown in the right hand force diagram which draws the flower stem into the cutting device so that the device provides a clean cut to the flower stem.

While I have shown and described a preferred embodiment of the invention, it will be apparent that the invention is capable of variation and modification from the form shown so that the scope thereof should be limited only by the proper scope of the claims appended hereto.

What I claim is:

1. In an apparatus for trimming the stems of cut flowers, the combination of means conveying cut flowers, flower stem cutting means, means supporting said cutting means adjacent to said conveying means so that the flower stems on said conveying means are moved to said cutting means, said cutting means comprising a pair of blades each having a sharp edge, means pivotally supporting one of said blades, means moving said one of said blades with the sharp edge thereof toward the sharp edge of the other of said blades as said conveying means moves the stem of a flower through said cutting means, said pivoting support of said one blade being located well above the line of travel of the flower stems passing through said cutting means and the sharp edge of said one blade having means shaped so that the flower stem being cut by said cutting means is drawn into said cutting means by the cutting action of said cutting means simultaneously as said flower stem is conveyed by said conveying means thereby resulting in a clean cut of said flower stem.

2. In an apparatus for trimming the stems of cut flowers, the combination as set forth in claim 1, further characterized in that the sharp edge of the other of said blades is provided with a substantially horizontal portion supported substantially on the line of travel of the flower stems as said flower stems are carried by said conveying means.

3. In an apparatus for trimming the stems of cut flowers, the combination as set forth in claim 2, further characterized in that said means moving said one of said blades comprises an eccentric, a connecting rod attached to said eccentric and to said movable blade so that said movable blade is oscillated with respect to said other blade as a flower stem is moved by said conveying means through said cutting means.

4. In an apparatus for trimming the stems of cut flowers, the combination as set forth in claim 3, further characterized in that said means pivotally supporting said one blade comprises an upright member attached to said other blade, said upright member having a pivot in the upper part thereof pivotally supporting said one blade.

* * * * *